United States Patent [19]
Bailey

[11] Patent Number: 4,787,260
[45] Date of Patent: Nov. 29, 1988

[54] SELF-ALIGNMENT DEVICE FOR BALLSCREW ARRANGEMENT

[75] Inventor: Edward J. Bailey, Cincinnati, Ohio

[73] Assignee: Cincinnati Milacron Inc., Cincinnati, Ohio

[21] Appl. No.: 40,222

[22] Filed: Apr. 20, 1987

[51] Int. Cl.⁴ .............................................. F16H 25/20
[52] U.S. Cl. ................................ 74/89.15; 74/424.8 R
[58] Field of Search ................ 74/424.8 R, 89.15; 384/581, 901, 535

[56] References Cited

U.S. PATENT DOCUMENTS

| 2,778,239 | 1/1957 | Hoover | 74/424.8 R |
| 3,318,171 | 5/1967 | Wilkinson et al. | 74/89.15 |
| 3,398,598 | 8/1968 | Gress, Jr. | 74/424.8 |
| 4,368,647 | 1/1983 | Sakaguchi | 74/89.22 |
| 4,530,251 | 7/1985 | Henle | 74/89.15 |
| 4,550,626 | 11/1985 | Brouwer | 74/409 |

FOREIGN PATENT DOCUMENTS

| 3623112 | 1/1987 | Fed. Rep. of Germany | 74/89.15 |
| 59-9352 | 1/1984 | Japan | 74/424.8 R |
| 1142681 | 2/1985 | U.S.S.R. | |

Primary Examiner—Leslie A. Braun
Assistant Examiner—Scott Anchell
Attorney, Agent, or Firm—Frost & Jacobs

[57] ABSTRACT

There is provided a self-aligning ballscrew assembly for a manipulator device for reciprocating an extension element along a linear extension axis, with the self-aligning ballscrew assembly including a ballscrew having a longitudinal axis. A ballscrew bearing block is provided having a ballscrew nut mounted on the ballscrew for translating an extension element of the manipulator device along a linear extension axis in response to relative rotation between the ballscrew and the ballscrew nut, and a drive motor selectively provides relative rotation between the ballscrew and the ballscrew nut. A reed-spring arrangement flexibly connects the bearing block to the manipulator device, with such flexible reed-spring arrangement permitting limited linear movement of the bearing block and ballscrew nut with the ballscrew in a direction normal to the longitudinal axis, as well as limited rotational movement about an axis mutually perpendicular to the longitudinal axis and the normal direction, while maintaining proper angular alignment of the ballscrew nut relative the ballscrew.

22 Claims, 5 Drawing Sheets

SELF-ALIGNMENT DEVICE FOR BALLSCREW ARRANGEMENT

TECHNICAL FIELD

This invention relates to ballscrew arrangements for manipulator devices and similar applications where a portion of a device is to be reciprocated along a linear axis by such ballscrew, and, more particularly, to a self-alignment device for a ballscrew arrangement wherein proper angular alignment between such ballscrew and its corresponding ballscrew nut is constantly maintained by a flexible mounting system.

BACKGROUND ART

Ballscrew arrangements are widely used in a variety of applications where adjustment or other movement of a portion of a manipulator device along a linear axis is desired. Most commonly, a ballscrew nut is threadedly mounted on the ballscrew, and relative rotation between the ballscrew and the ballscrew nut causes translation of either the ballscrew nut relative the ballscrew along its longitudinal axis or the ballscrew relative the ballscrew nut (depending on which part is held stationary) as a result of the threaded interaction between these parts. Direction of displacement of the ballscrew nut (or the ballscrew) along the linear axis depends upon the direction of the relative rotation between the ballscrew and the ballscrew nut.

Connection of the ballscrew nut and its associated structure to the manipulator device is conventionally accomplished by a relatively rigid arrangement. In operation, the reciprocation of an extension element or other movable part of the device along the ballscrew's linear axis often imposes eccentric loads on the ballscrew nut relative the ballscrew as a result of rocking motions or other deflections caused by the mass of the movable part itself, various payloads affected by such movable parts, sudden stops or starts of movement, and the like. As a result of such eccentric loads, the alignment of the ballscrew nut vis-a-vis the ballscrew may be adversely affected, causing the threads of the ballscrew nut to be slightly misaligned vis-a-vis the corresponding threads of the ballscrew. Such misalignment can cause binding interaction between the ballscrew nut and the ballscrew, inconsistent performance or movement of the ballscrew nut along the ballscrew, premature fatigue failure, introduction of backlash or slack into the system, and, possibly, literal destruction of the threaded interacting surfaces of these parts. In robotic applications in particular, such premature wear and failure of various ballscrew parts deceases reliability and safety of the mechanisms, and increases costs to the industry.

Linear slides and rotary trunnion mountings have often been utilized in the industry to provide alignment tolerances to various moving parts, including ballscrew arrangements; however, such systems have proved to he expensive, inconvenient and bulky, and subject to excessive wear (thereby increasing the clearances within the system and allowing backlash and further misalignment to propagate). Moreover, linear slides such as dovetail trunnion mountings, require duplicative structures to provide for multidirectional freedoms of movement. Such inefficiency adds to the complexity and cost, and reduces reliability of such a system.

Consequently, despite the wide-range use of ballscrew devices for various applications, the industry has heretofore failed to provide a ballscrew and ballscrew nut arrangement which simply, automatically, and consistently maintains proper alignment under varying conditions and loads applied to a system. As a result, there remain problems of providing a dependable ballscrew arrangement which can adapt automatically to variations in its ballscrew/ballscrew nut alignment while maintaining overall stiffness or rigidity of the system and minimizing slack or backlash in the system.

DISCLOSURE OF THE INVENTION

It is an object of this invention to obviate the above-described problems.

It is another object of the present invention to provide a self-aligning device for a ballscrew arrangement for maintaining proper angular alignment between the ballscrew and the ballscrew nut while also maintaining the appropriate stiffness of the system.

It is yet another object of the present invention to provide a self-aligning device for ballscrew arrangements which provides for limited linear movement of the ballscrew nut relative the ballscrew in a direction normal to the longitudinal axis of the ballscrew, while maintaining proper parallel alignment therebetween.

In accordance with one aspect of the present invention, there is provided a self-aligning ballscrew assembly for a manipulator device for reciprocating an extension element along a linear extension axis, with the self-aligning ballscrew assembly including a ballscrew having a longitudinal axis. A ballscrew bearing block is provided having a ballscrew nut mounted on the ballscrew for translating an extension element of the manipulator device along a linear extension axis in response to relative rotation between the ballscrew and the ballscrew nut, and drive means are included for selectively providing relative rotation between the ballscrew and the ballscrew nut. A flexible mounting means for connecting the bearing block to the manipulator device is included, with such flexible mounting means permitting limited linear movement of the bearing block and ballscrew nut relative the ballscrew in a direction normal to the longitudinal axis, as well as limited rotational movement about an axis mutually perpendicular to the longitudinal axis and the normal direction, while maintaining proper angular alignment of the ballscrew nut relative the ballscrew.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE INVENTION

Figure 1:
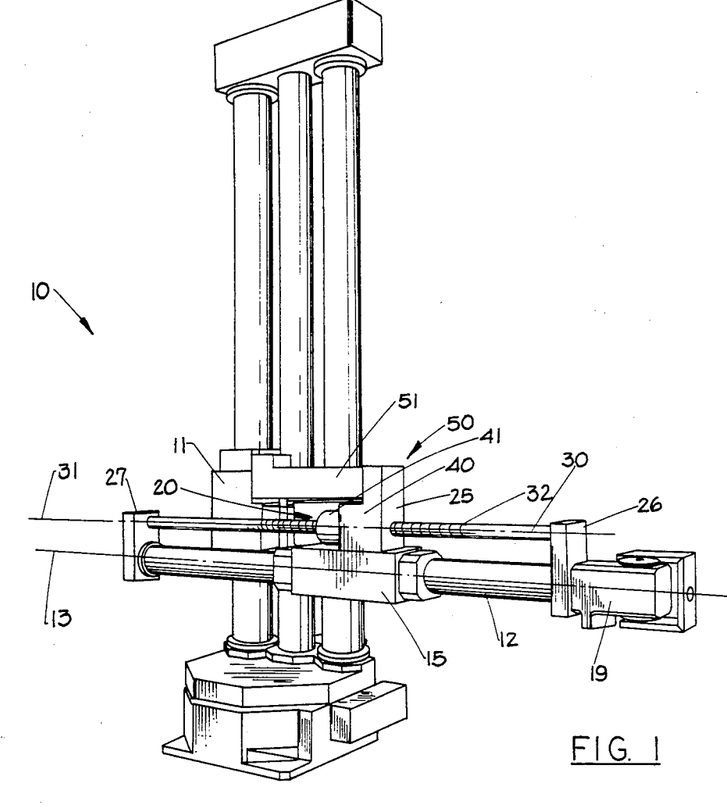
FIG. 1 is a perspective view of a manipulator device incorporating a self-aligning ballscrew assembly of the subject invention.

Referring now to the drawings in detail, wherein like numerals indicate the same elements throughout the views, FIG. 1 illustrates a robotic manipulator 10 incorporating a self-aligning ballscrew assembly 20 of the subject invention. While the manipulator device 10 illustrated in FIG. 1 shows an application of the subject invention in a robotic manipulator environment, it should be noted that the subject invention is not limited to robotic applications and can be incorporated as the ballscrew assembly for any ballscrew arrangement which requires additional structure to provide self-orientation features to ensure the maintenance of proper alignment between a ballscrew and its corresponding ballscrew nut. In this regard, as used herein the term "manipulator device" shall connote any apparatus utilizing a ballscrew arrangement to translate an extension element or movable part along a linear extension axis.

The manipulator device 10 of FIG. 1 generally includes a manipulator casting 11 to which slide housing or guide sleeve 15 is rigidly attached. Reciprocably supported by slide housing 15 is extension tube 12 which is to be reciprocated by manipulator device 10 to correspondingly reciprocate extension element 19 attached at the distal end of tube 12. Extension element 19 might preferably be a movable robotic part or the like. Extension tube 12 is supported by slide housing 15 for reciprocation along the linear extension axis 13.

Mounted above slide housing 15, and flexibly connected thereto as will be seen in greater detail below, is the ballscrew assembly 20 which comprises a ballscrew 30, a ballscrew bearing block 40 having a ballscrew nut 41, and drive means 50 for selectively providing relative rotation between ballscrew 30 and ballscrew nut 41. More particularly, ballscrew 30 is shown as being mounted between connection plates 26 and 27, respectively, along the longitudinal axis 31. In an application as illustrated in FIG. 1 where extension tube 12 is to be reciprocated along a linear extension axis 13 in response to relative rotation between ballscrew 30 and ballscrew nut 41, longitudinal axis 31 is preferably substantially parallel to linear extension axis 13. In the embodiment shown in FIG. 1, extension tube 12 and ballscrew 30 are located relative one another by a means of the connection plates 26 and 27, respectively, located at the distal ends thereof. Ballscrew 30 is illustrated as including high speed, helical external thread grooves 32 formed therein for threaded interaction with corresponding internal grooves formed in ballscrew nut 41, as will be described in greater detail below.

Figure 2:
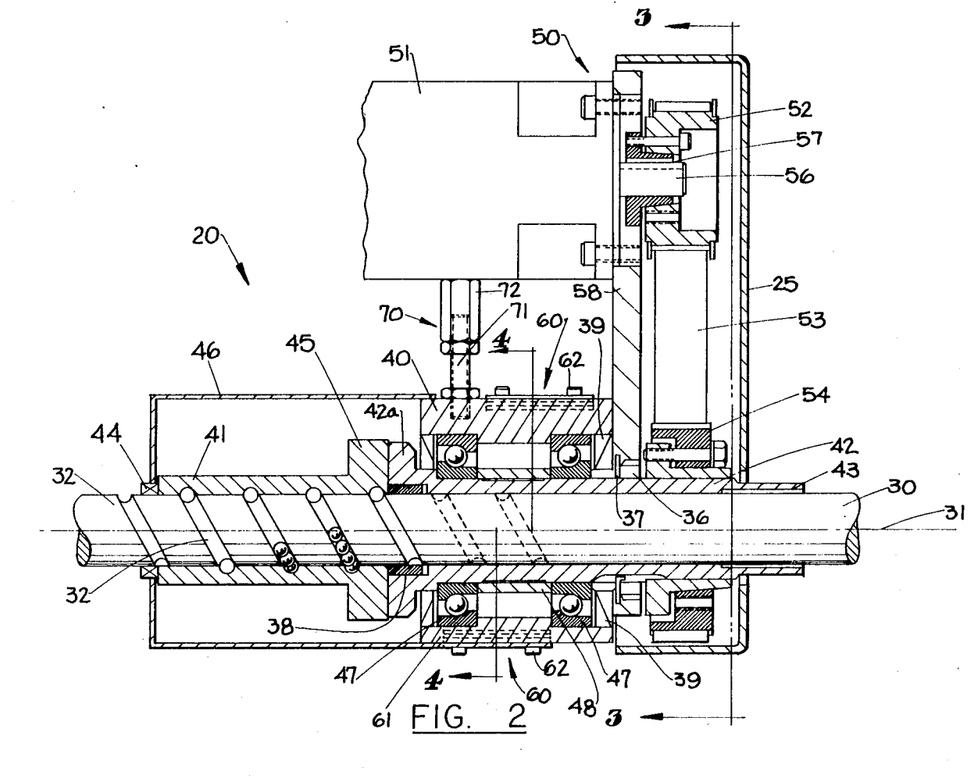
FIG. 2 is a fragmentary, cross-sectional view of a portion of a self-aligning ballscrew assembly made in accordance with the present invention.

A more detailed, fragmentary, cross-sectional view of ballscrew assembly 20 is shown in FIG. 2. As indicated above, ballscrew 30 passes through ballscrew bearing block 40 along longitudinal axis 31. Telescopically mounted for rotation relative ballscrew 30 is ballscrew drive sleeve 42 which has an internal bore having a diameter slightly larger than the outside diameter of ballscrew 30 to permit substantially noninterfering rotation of drive sleeve 42 relative ballscrew 30. At its innermost end, drive sleeve 42 includes a radially extending connector flange 42a, and at its outermost end is rotatably supported on ballscrew 30 by bearing 43. A pilot 38 is employed at the innermost end of drive sleeve 42 to facilitate the maintenance of concentricity of drive sleeve 42 and nut 41 relative ballscrew 30. Bearing 43 of drive sleeve 42 also helps maintain the angular alignment of sleeve 42 and attached nut 41 relative ballscrew 30 along their longitudinal axes. Drive sleeve 42 is connected at its innermost end by flange 42a to a corresponding flange 45 of ballscrew nut 41, and may be held within block 40 by flange 42a and locknut 36 (and lockwasher 37) threaded on to the exterior of drive sleeve 42 as shown. Locknut 36 also serves to maintain bearings 47, bearing seals 39, and spacer ring 48 within bearing block 40.

As mentioned, ballscrew nut 41 and ballscrew 30 are formed with corresponding helical grooves, and a plurality of balls are located in these grooves to serve as an antifriction drive connection between nut 41 and ballscrew 30. As this drive connection is well known in the industry, further details will not be included herein. An optional housing 46 (not shown in FIG. 1) is illustrated in FIG. 2 as including a grease seal 44, and may be preferred for safety and/or general cleanliness.

Ballscrew drive sleeve 42 is rotatably mounted within bearing block 40 by a pair of spaced bearings 47, which are held against shoulders formed within block 40. Adjacent its outer end, drive sleeve 42 is rigidly connected to input pulley 54 which circumscribes the outer periphery of drive sleeve 42. Pulley 54 can be connected to drive sleeve 42 by any conventional means.

In a preferred embodiment, drive means 50 for selectively providing relative rotation between ballscrew 30 and nut 41 is integrally connected to bearing block 40. While connection of drive means 50 to bearing block 40 is not critical, it is preferred in the particular application illustrated to facilitate maintenance of proper tension on the rotational transfer means 53 (i.e. a drive belt). In the embodiment shown, a rotational drive motor 51 is rigidly attached to bearing block 40 by an upwardly extending attachment plate 58 such that its output drive shaft 56 is located above input pulley 54 of drive sleeve 42. A rotational output pulley 52 is connected to drive shaft 56 for rotation therewith, such as by a key/keyway arrangement 57. Output pulley 52 transmits rotational movement from motor 51 to input pulley 54 by a transfer means 53 such as a drive belt. Tension in transfer means 53 can be appropriately adjusted by manipulation of screw jack device 70, which includes adjustment bolt 71 and threaded sleeve 72.

Figure 3:
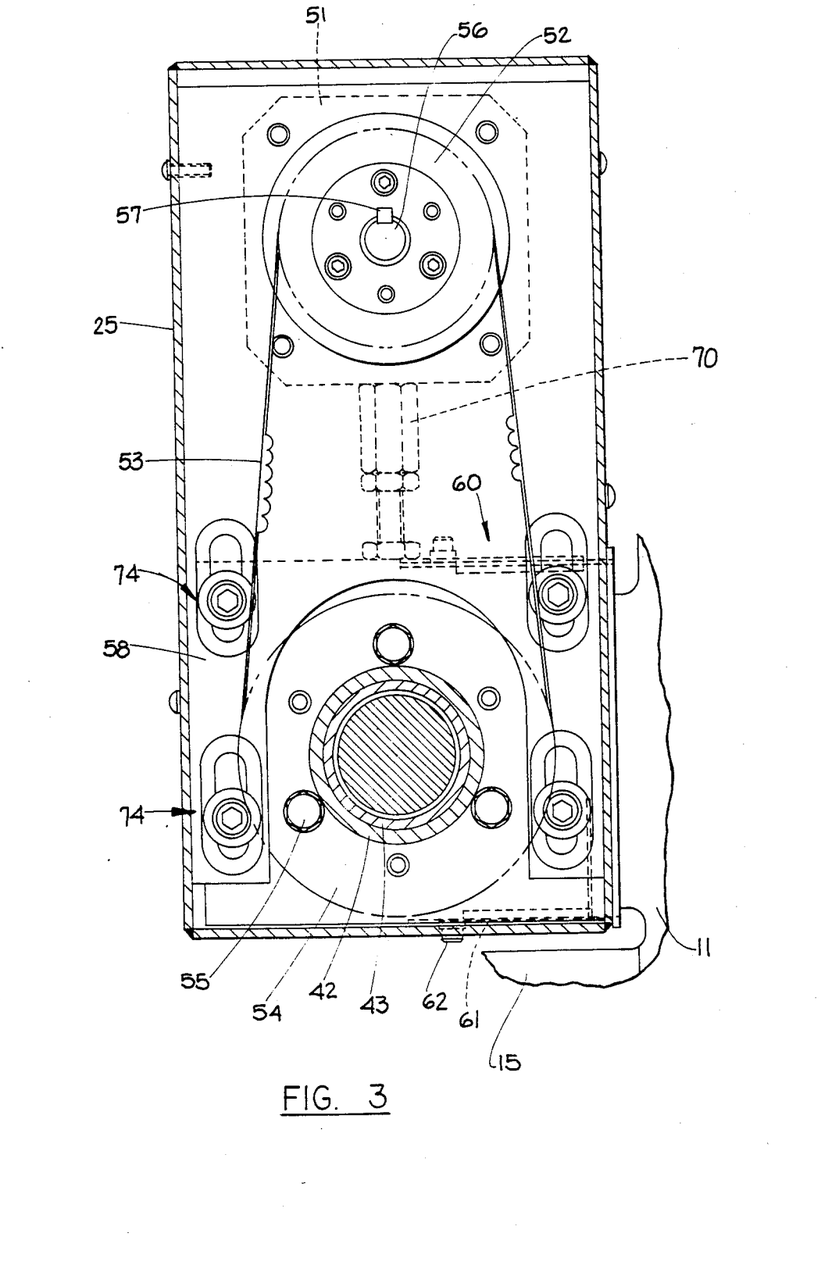
FIG. 3 is a cross-sectional view of a portion of the self-aligning ballscrew assembly of FIG. 2, taken along line 3—3 thereof.

As seen best in the cross-sectional view of FIG. 3, attachment plate 58 is preferably connected to bearing block 40 in an adjustable manner such as by the slot/bolt arrangements 74. Such adjustable mounting structure facilitates adjustment of the tension on the transfer means 53. It should be noted that any means of providing relative rotation between nut 41 and ballscrew 30 can be utilized in a ballscrew assembly made in accordance with the present invention. While the embodiment shown illustrates rotation of nut 41 relative a stationary ballscrew 30, this arrangement could easily be reversed in a specific application where it might be preferred to rotate ballscrew 30 relative a stationary nut 41. Moreover, the attachment of drive means 50 and the transmission of its rotational input to the ballscrew assembly is shown here only as an example of the plethora of ways in which the same could be accomplished by one knowledgeable in the art.

It is critical, however, that bearing block 40 and its ballscrew nut 41 be flexibly mounted to permit limited linear movement thereof without ballscrew 30 in a direction normal to longitudinal axis 31, as well as limited rotational movement about an axis mutually perpendicular to longitudinal axis 31 and the normal direction, while maintaining proper angular alignment of ballscrew nut 41 relative ballscrew 30. As used herein, the term "proper alignment" shall mean the parallel alignment of the central axis of the ballscrew nut with the longitudinal axis 31 of ballscrew which is necessary to minimize wear and tear on the interacting threads of ballscrew 30 and ballscrew nut 41 in order to maximize the working life expectancy of these parts. Ballscrew arrangements can tolerate very little angular misalignment, especially in high speed and relatively high load operations. While exact tolerances and clearances vary between applications, the subject invention is designed to maintain the relative parallel alignment of the axes of a ballscrew nut and its corresponding ballscrew and minimize angular misalignment therebetween to on the order of approximately ±0.0005 radians.

Figure 4:
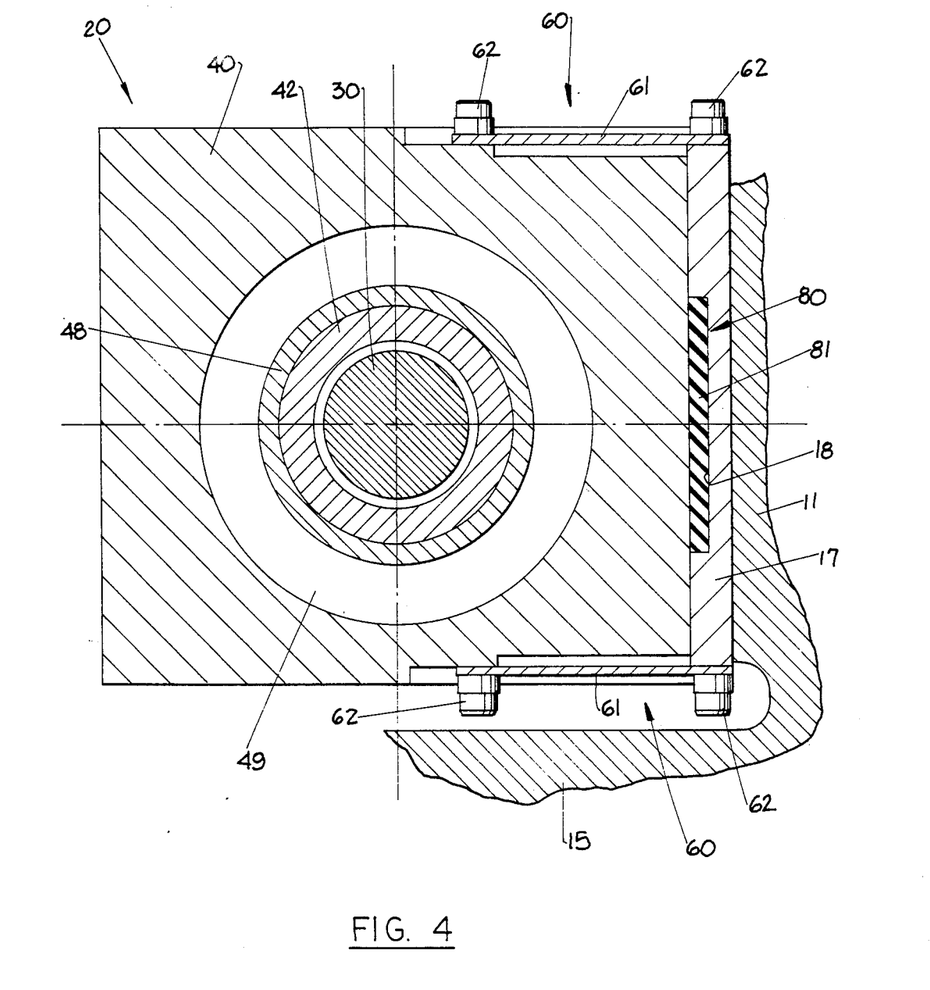
FIG. 4 is an enlarged, fragmentary, cross-sectional view of the ballscrew bearing block of FIG. 2, taken along line 4—4 thereof.
Figure 5:
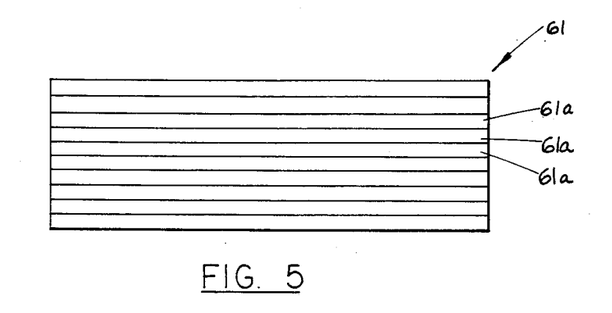
FIG. 5 is an enlarged view of a reed spring stack as shown in FIG. 4.

Referring now to FIG. 4, an enlarged, fragmentary cross-sectional view of bearing block 40 is shown, emphasizing its flexible attachment to manipulator device 10. In particular, bearing block 40 and its ballscrew nut 41 are flexibly mounted with a pair of flexible mounting means 60. Flexible mounting means 60 each preferably comprise reed spring plates 61 which are rigidly fastened at one end to ballscrew mounting plate 17, which, in turn, is rigidly fixed to a portion of casting 11 of manipulator device 10, such as by screws or the like (not shown). In particular, it is preferred that each flexible mounting means 60 comprise a set of reed spring plates 61 anchored at their opposite ends by any convenient anchoring means, such as bolts 62. As best illustrated in FIG. 5, it is preferred that reed spring plates 61 comprise a plurality of relatively flexible leaf-type spring plates 61a stacked in face-to-face relationship and anchored at their opposite ends. The flexible mounting of bearing block 40 by means of such reed spring plates 61 permits limited linear movement of bearing block 40 and ballscrew nut 41 with ballscrew 30 in a direction normal to longitudinal axis 31, as well as limited rotational movement about an axis mutually perpendicular to longitudinal axis 31 and such normal direction, while minimizing radial reaction forces between ballscrew nut 41 and ballscrew 30. The use of a plurality of stacked reed spring plates 61a minimizes the stiffness of flexible mounting means 60 in the direction normal to longitudinal axis 30, but maintains the stiffness of the assembly in all other directions, thereby prohibiting substantially all movement of bearing block 40 and ballscrew nut 41 in directions other than those in which limited movement is permitted (i.e. parallel to the longitudinal axis). It should be noted that such multidirectional freedoms of movement is critical to minimizing reaction forces between the ballscrew nut 41 and ballscrew 30. Nut 41 must be maintained substantially parallel to ballscrew 30 along their longitudinal axes to maintain the angular alignment therebetween. Therefore, in these directions of freedom it is desired to minimize the stiffness of the system while maintaining substantially rigid attachment in all other directions.

As best shown in Fi. 2, it is preferred that the pair of flexible mounting means 60 be longitudinally offset relative one another along longitudinal axis 31 to provide for the limited rotational movement about an axis mutually perpendicular to longitudinal axis 31 and the normal direction. The exact amount of offset is not critical, and can be adjusted for specific applications according to desired rotational freedom of in the system. Larger offsets would, of course, increase the rotational freedom of the system.

It is contemplated that reed spring plates 61 can be made of standard reed- or leaf-type springs available in the industry, and while their exact size (e.g. length, width and thickness) is not critical, it is important that the resulting flexible mounting means 60 be very flexible and feature a relatively small spring rate, providing limited but relatively unencumbered freedom of movement in the desired directions while maintaining stiffness in all other directions. It should also be understood that for common ballscrew arrangements, the amplitude of movement in the desired directions commonly required to ensure the maintenance of proper angular alignment between ballscrew nut 41 and ballscrew 30 is relatively small (e.g. on the order of approximately 0.5 mm or less).

It has been found that at least two flexible mounting means 60 are preferably utilized to attach bearing block 40 to manipulator device 10.

It is contemplated that in the embodiment illustrated in FIGS. 1 through 4, bearing block 40 is to be flexibly mounted to ballscrew plate 17, which is rigidly attached to slide housing 15 and manipulator casting 11. To facilitate the limited movement of bearing block 40 and ballscrew nut 41 relative ballscrew 30, a small clearance gap is maintained between plate 17 and the adjacent surface of bearing block 40. While the size of this clearance gap is not critical, it is important because as reed springs 61 are deformed in response to eccentric loads imposed on block 40, the gap will close slightly. The maintenance of a minimal gap insures the relatively free movement of the system by allowing for such deformation of the reed springs.

As also shown in FIG. 4, ballscrew mounting plate 17 is formed with a recess 18 to accommodate an optional damping means 80 for absorbing shocks and vibrations which may otherwise be imposed on bearing block 40 by drive means 50, by movements of the manipulator device 10, by outside sources via manipulator casting 11, or otherwise. In order to provide a more stabilized system, it is preferred that damping means 80 be included with a ballscrew assembly as described herein. In particular, damping means 80 can comprise a pad 81 of shock absorbing material such as visco-elastic material (commonly available in the industry, such as from EAR Corporation of Indianapolis, Ind.) to absorb such shocks and vibrations. The size and overall area of such damping means 80 is application specific and can be generally calculated for any particular structure depending upon the overall spring rate of the system, as well as the mass of the bearing block, drive means and other related structures.

Figure 6:
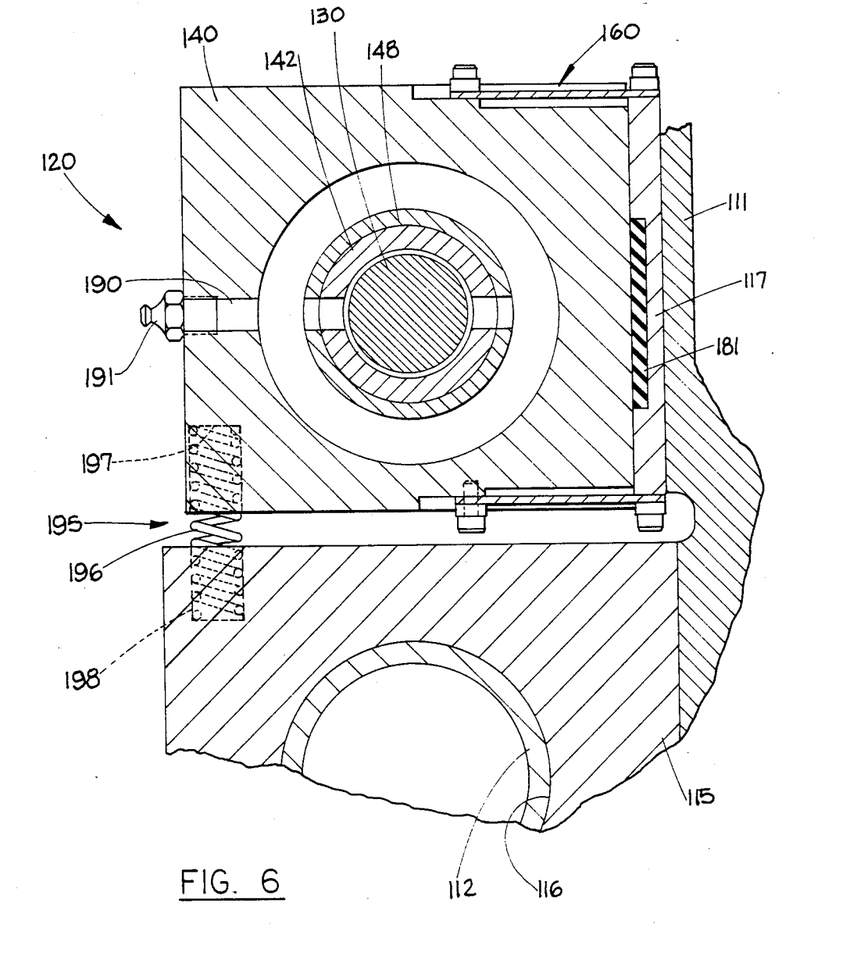
FIG. 6 is a fragmentary, cross-sectional view of an alternate embodiment of a ballscrew bearing block of the present invention.

In FIG. 6, a modified and more preferred embodiment of the flexible mounting arrangement of the ballscrew assembly of the subject invention is illustrated. While the ballscrew assembly of FIG. 6 is quite similar to the structure illustrated in FIG. 4, it includes a counterbalance means 195 for offsetting misaligning forces which may be imposed on bearing block 140 and its associated ballscrew nut (not shown) by the mass of a drive motor (not shown) integrally attached to bearing block 140. To emphasize the similarily of the structures shown in FIGS. 4 and 6, respectively, similar elements of FIG. 6 are designated with numbers having the identical last two digits as the corresponding parts from FIG. 4. In this regard, bearing block 140 is shown as being flexibly attached to ballscrew mounting plate 117 which is rigidly attached to manipulator casting 111 and slide housing 115. Slide housing 115 includes bore 116 for receiving extension tube 112 therewithin.

Preferably, ballscrew assembly 120 further comprises counterbalance means 195 located between slide housing 115 and bearing block 140. In particular, bearing block 140 and slide housing 115 are formed with oppositely disposed recesses 197 and 198, respectively, for receiving a compression spring 196 or the like designed to impose counterbalancing forces on bearing block 140. These counterbalancing forces are intended to offset radial loads and forces imposed on the ballscrew nut by the mass of the drive motor (not shown) and bearing block 140. While any kind of spring element can be used to accomplish this counterbalancing force, it is preferred that a relatively long compression spring 196 with a low spring constant be employed such that small deflections therein do not significantly increase the resulting forces imposed between ballscrew 130 and the ballscrew nut of the assembly.

The exact size of such counterbalance means 195, as well as its location between bearing block 140 and slide housing 115 must be determined on a case-by-case basis depending upon the relative masses of the drive means and other structures, their respective attachment locations, and the like. By incorporating counterbalance means 195 in addition to flexible mounting means 160, substantially all side loads and other unwanted eccentric forces between a ballscrew and its associated ballscrew nut can be eliminated as a result of the self-aligning character of the resulting assembly. As also illustrated in FIG. 6, provision for lubrication of the moving parts within ballscrew block 140 can be provided. Particularly, a grease fitting 191 is shown in conjunction with lubrication channel 190 which is in fluid communication with the space 149, and which can be extended through spacer ring 148 and drive sleeve 142 as shown. In this way, lubrication can be forced into and around all movable parts within bearing block 140 and its associated drive sleeve 142 and ballscrew nut (not shown).

The operation of the subject invention will be described in the context of the embodiment of FIGS. 1 through 5. In operation, rotational force is selectively applied by drive means 50 to provide relative rotation between ballscrew 30 and ballscrew nut 41. In a preferred embodiment, this rotational movement is applied to a rotatable ballscrew nut 41 relative the stationary ballscrew 30. Such relative rotation causes ballscrew 30 to be linearly translated along longitudinal axis 31, thereby simultaneously moving connection plates 26 and 27, extension tube 12, and the attached extension element or movable part 19. By selecting the direction, speed, and amount of rotational input, the linear movement of extension element 19 along extension axis 13 can be controlled as desired. The rotational force applied by drive means 50 through output pulley 52, belt 53, input pulley 54, and drive sleeve 42 to ballscrew nut 41 can impose vibrations, shocks, and other extraneous torquing forces on bearing block 40 and ballscrew nut 41. Additionally, backlash, vibrations, shocks and the like may also be imposed by reciprocation of extension tube 12. It is these eccentric forces which commonly cause misalignment of a ballscrew nut with a ballscrew, which can greatly accelerate wear and deterioration of the ballscrew assembly. Such wear and deterioration, of course, can result in inferior performance, and/or premature failure.

Bearing block 40 made in accordance with the subject invention, however, is flexibly mounted to manipulator device 10 by a pair of flexible mounting means 60. As described above, the flexible mounting means permits limited linear movement of bearing block 40 and ballscrew nut 41 relative ballscrew 30 in a direction normal to longitudinal axis 31, as well as limited rotational movement about an axis mutually perpendicular to longitudinal axis 31 and the normal direction. By providing for such limited movement of ballscrew nut 41 relative ballscrew 30, substantially all unwanted eccentric forces are eliminated between these interacting parts, as ballscrew nut 41 is maintained in proper alignment with ballscrew 30 at all times. As described in relation to FIG. 6 hereof, in a preferred embodiment, the ballscrew assembly of the subject invention further includes a counterbalancing force to offset any additional misaligning (i.e. radial) forces which may be imposed on ballscrew nut 41 by the overhanging mass of the attached drive means 50 and bearing block 40. Additionally, in a preferred embodiment, the ballscrew assembly is to include a damping means 80 for absorbing shocks and vibrations imposed on the bearing block 40 and nut 42.

In this way, the flexible mounting means 60 provides relatively unencumbered, limited freedom of movement in the directions required to properly maintain angular alignment between the ballscrew nut and the ballscrew, while maintaining stiffness in all non-aligning directions. This self-aligning feature minimizes extraneous forces which might cause the ballscrew nut to bind upon the ballscrew during operation, maintaining the nut and ballscrew longitudinal axes parallel to one another and thereby protecting the interacting portions of such ballscrew and ballscrew nut and maximizing the effective working life of such parts. By minimizing wear and tear on such interacting ballscrew parts, resulting backlash or slack which normally enters into ballscrew arrangements a they become worn is also minimized.

Having shown and described the preferred embodiment of the present invention, further adaptions of the self-aligning ballscrew assembly of the present invention can be accomplished by appropriate modifications by one of ordinary skill in the art without departing from the scope hereof. Several such alternatives and modifications have been described herein, and others will be apparent to those skilled in the art. For example, while the self-aligning ballscrew assembly of the subject invention has been shown and described in the context of the reciprocation of an extension element along a linear extension axis of a robotic manipulator device, it should be understood that this invention can equally be applied to any manipulator device utilizing a ballscrew arrangement for reciprocation along a linear axis where self-orientation of the ballscrew assembly cannot otherwise be accomplished. Similarly, while reed spring or leaf-type flexible mounting plates have been shown and described as the preferable flexible mounting means herein, it is contemplated that other similar flexible mounting devices could equally be substituted for the reed springs in accordance with this invention. Accordingly, the scope of the present invention should be considered in terms of the following claims and is understood not to be limited to the details of the structures and arrangements shown and described in the specification and drawings.

I claim:

1. A self-aligning ballscrew assembly for a ballscrew arrangement of a manipulator device for reciprocating an extension element along a linear extension axis, said assembly comprising;
   (a) a ballscrew having a longitudinal axis;
   (b) a ballscrew bearing block having a ballscrew nut mounted on said ballscrew for translating the extension element of said manipulator device along a linear extension axis in response to relative rotation between said ballscrew and said ballscrew nut;
   (c) drive means for selectively providing relative rotation between said ballscrew and said ballscrew nut; and
   (d) flexible mounting means for connecting said bearing block to said manipulator device, said flexible mounting means further comprising a pair of reed spring arrangements for permitting limited linear movement of said bearing block and said ballscrew nut with said ballscrew in a direction normal to said longitudinal axis, and limited rotational movement about an axis mutually perpendicular to said longitudinal axis and said normal direction, while maintaining proper alignment of said ballscrew nut relative said ballscrew.

2. The self-aligning ballscrew assembly of claim 1, wherein said flexible mounting means further prohibits substantially all movement of said bearing block and said ballscrew nut in directions parallel to said longitudinal axis.

3. The self-aligning ballscrew assembly wherein said longitudinal axis is substantially parallel to said linear extension axis.

4. The self-aligning ballscrew assembly of claim 3, wherein said linear extension axis is substantially horizontal in orientation.

5. The self-aligning ballscrew assembly of claim 1, further comprising damping means for absorbing shocks and vibrations imposed on said flexibly mounted bearing block and ballscrew nut.

6. The self-aligning ballscrew assembly of claim 1, wherein said drive means is integrally attached to said bearing block.

7. The self-aligning ballscrew assembly of claim 1, wherein said extension element of the manipulator device is supported by a slide housing for reciprocation along the extension axis, and wherein said bearing block is flexibly attached to said slide housing by said flexible mounting means.

8. A self-aligning ballscrew assembly for a ballscrew arrangement of a manipulator device for reciprocating an extension element along a linear extension axis, said assembly comprising:
   (a) a ballscrew having a longitudinal axis;
   (b) a ballscrew bearing block having a ballscrew nut mounted on said ballscrew for translating the extension element of said manipulator device along a linear extension axis in response to relative rotation between said ballscrew and said ballscrew nut;
   (c) drive means for selectively providing relative rotation between said ballscrew and said ballscrew nut; and
   (d) flexible mounting means for connecting said bearing block to said manipulator device, said flexible mounting means further comprising a pair of reed spring arrangements offset relative one another along said longitudinal axis for permitting limited linear movement of said bearing block and said ballscrew nut with said ballscrew in a direction normal to said longitudinal axis, and limited rotational movement about an axis mutually perpendicular to said longitudinal axis and said normal direction, while maintaining proper alignment of said ballscrew.

9. A self-aligning ballscrew assembly for a ballscrew arrangement of a manipulator device for reciprocating an extension element along a linear extension axis, said assembly comprising:
   (a) a ballscrew having a longitudinal axis;
   (b) a ballscrew bearing block having a ballscrew nut mounted on said ballscrew for translating the extension element of said manipulator device along a linear extension axis in response to relative between said ballscrew and said ballscrew nut;
   (c) drive means for selectively providing relative rotation between said ballscrew and said ballscrew nut, said drive means being integrally attached to said bearing block;
   (d) counterbalance means for offsetting misaligning forces imposed on said ballscrew nut by the mass of said bearing block and attached drive means; and
   (e) flexible mounting means for connecting said bearing block to said manipulator device, said flexible mounting means further comprising a pair of reed spring which permit limited linear movement of said bearing block and said ballscrew nut relative said ballscrew in a direction normal to said longitudinal axis, and limited rotational movement about an axis mutually perpendicular to said longitudinal axis and said normal direction, while maintaining proper alignment of said ballscrew.

10. A self-aligning ballscrew assembly for a ballscrew arrangement or reciprocating an extension element along a linear extension axis, said assembly comprising:
    (a) a ballscrew having a longitudinal axis;
    (b) an extension element which is reciprocable along a linear extension axis, said extension axis being substantially parallel to said longitudinal axis;
    (c) a ballscrew bearing block having a ballscrew nut mounted on said ballscrew for translating said extension element along said extension axis in response to relative rotation between said ballscrew and said ballscrew nut;
    (d) drive means for selectively providing relative rotation between said ballscrew and said ballscrew nut; and
    (e) flexible mounting means for connecting said bearing block to a slide housing which supports the extension element as it is reciprocated along said extension axis, said flexible mounting means further comprising a pair of reed spring arrangements which permit limited linear movement of said bearing block and said ballscrew nut with said ballscrew in a direction normal to said longitudinal axis and limited rotational movement about an axis mutually perpendicular to said longitudinal axis and said normal direction, while maintaining proper angular alignment of said ballscrew nut relative said ballscrew.

11. The self-aligning ballscrew assembly of claim 6, wherein said flexible mounting means further prohibits substantially all movement of said bearing block and said ballscrew nut in directions parallel to said longitudinal axis.

12. The self-aligning ballscrew assembly of claim 10, wherein said linear extension axis is substantially horizontal in orientation.

13. The self-aligning ballscrew assembly of claim 10, wherein said reed spring arrangements each comprise a plurality of relatively flexible leaf-type springs stacked in face-to-face relationship and anchored at their opposite ends.

14. The self-aligning ballscrew assembly of claim 10, further comprising damping means for absorbing shocks and vibrations imposed on said flexibly mounted bearing block and ballscrew nut.

15. The self-aligning ballscrew assembly of claim 14, wherein said damping means comprises a visco-elastic material.

16. The self-aligning ballscrew assembly of claim 10, wherein said drive means is integrally attached to said bearing block.

17. A self-aligning ballscrew assembly for a ballscrew arrangement for reciprocating an extension element along a linear extension axis, said assembly comprising:
(a) a ballscrew having a longitudinal axis;
(b) an extension element which is reciprocable along a linear extension axis, said extension axis being substantially parallel to said longitudinal axis;
(c) a ballscrew bearing block having a ballscrew nut mounted on said ballscrew for translating said extension element along said extension axis in response to relative rotation between said ballscrew and said ballscrew nut;
(d) drive means for selectively providing relative rotation between said ballscrew and said ballscrew nut; and
(e) flexible mounting means for connecting said bearing block to a slide housing which supports the extension element as it is reciprocated along said extension axis, said flexible mounting means including a pair of reed spring arrangement offset relative on another along said longitudinal axis which permit limited linear movement said bearing block and said ballscrew nut with said ballscrew in a direction normal to said longitudinal axis, and limited rotational movement about an axis mutually perpendicular to said longitudinal axis and said normal direction, while maintaining proper angular alignment of said ballscrew nut relative said ballscrew.

18. A self-aligning ballscrew assembly for a ballscrew arrangement for reciprocating an extension element along a linear extension axis, said assembly comprising:
(a) a ballscrew having a longitudinal axis;
(b) an extension element which is reciprocable along a linear extension axis, said extension axis being substantially parallel to said longitudinal axis;
(c) a ballscrew bearing block having a ballscrew nut mounted on said ballscrew for translating said extension element along said extension axis in response to relative rotation between said ballscrew and said ballscrew nut;
(d) drive means for selectively providing relative rotation between said ballscrew and said ballscrew nut, said drive means being integrally attached to said bearing block;
(e) counterbalance means for offsetting misaligning forces imposed on said ballscrew nut by the mass of said bearing block and attached drive means; and
(f) flexible mounting means for connecting said bearing block to a slide housing which supports the extension element as it is reciprocated along said extension axis, said flexible mounting means permitting limited linear movement of said bearing block and said ballscrew nut with said ballscrew in a direction normal to said longitudinal axis, and limited rotational movement about an axis mutually perpendicular to said longitudinal axis and said normal direction, while maintaining proper angular alignment of said ballscrew nut relative said ballscrew.

19. A self-aligning ballscrew assembly for a ballscrew arrangement for reciprocating an extension element along a linear extension axis, said assembly comprising:
(a) a ballscrew having a longitudinal axis oriented substantially horizontally
(b) an extension element which is reciprocable along a linear extension axis, said extension axis being substantially parallel to said longitudinal axis;
(c) a ballscrew bearing block having a ballscrew nut mounted on said ballscrew for translating said extension element along said extension axis in response to relative rotation between said ballscrew and said ballscrew nut;
(d) drive means integrally connected to said bearing block for selectively providing relative rotation between said ballscrew and said ballscrew nut;
(e) flexible mounting means for connecting said bearing block to a slide housing which supports said extension element as it is reciprocated along said extension axis said flexible mounting means comprising a pair of reed spring arrangements permitting limited linear movement of said bearing block and ballscrew nut with said ballscrew in a direction normal to said longitudinal axis and limited rotational movement about an axis mutually perpendicular to said longitudinal axis and said normal direction, while maintaining proper alignment of said ballscrew nut relative said ballscrew; and
(f) counterbalance means for offsetting misaligning forces imposed on said ballscrew nut by the mass of said bearing block and attached drive means.

20. The self-aligning ballscrew assembly of claim 19, wherein said reed spring arrangements each comprise a plurality of relatively flexible reed springs stacked in face-to-face relationship and anchored at their opposite ends.

21. The self-aligning ballscrew assembly of claim 19, wherein said reed spring arrangements are offset relative one another along said longitudinal axis to provide said limited rotational movement.

22. The self-aligning ballscrew assembly of claim 19, wherein said damping means comprises a visco-elastic material.

* * * * *